United States Patent [19]
Nouri

[11] Patent Number: 5,644,287
[45] Date of Patent: Jul. 1, 1997

[54] COMBINATION UNDERHOOD SECURITY SWITCH AND LAMP ASSEMBLY

[75] Inventor: Benjamin P. Nouri, West Bloomfield, Mich.

[73] Assignee: Chrysler Corporation, Auburn Hills, Mich.

[21] Appl. No.: 471,109

[22] Filed: Jun. 6, 1995

[51] Int. Cl.$^6$ ............................ B60R 25/10
[52] U.S. Cl. .................. 340/426; 340/429; 340/693; 362/80; 307/10.2
[58] Field of Search .................. 340/426, 425.5, 340/429, 693, 321, 691, 665, 566, 689; 362/80, 83.3; 200/61.45 R, 61.52, 52 A; 307/10.1, 10.2, 10.8

[56] References Cited

U.S. PATENT DOCUMENTS

| | | | |
|---|---|---|---|
| 3,792,435 | 2/1974 | Pace et al. | 340/429 |
| 4,683,521 | 7/1987 | Poleschuk et al. | 362/80 |
| 4,956,629 | 9/1990 | Chen | 340/429 |
| 5,278,452 | 1/1994 | Matsumoto et al. | 307/10.8 |
| 5,477,428 | 12/1995 | Brown et al. | 200/61.62 |
| 5,504,287 | 4/1996 | Cable | 362/80 |

*Primary Examiner*—Donnie L. Crosland
*Attorney, Agent, or Firm*—Mark P. Calcaterra

[57] ABSTRACT

A combination underhood security switch and lamp assembly that provides a security signal to a body control module of a vehicle indicative of an unauthorized entry into an engine compartment of the vehicle. The lamp assembly includes a switch that is closed when the vehicle hood is raised. When the switch closes, the lamp assembly is illuminated and a hood open signal is sent to the body control module. If the security system is armed, the body control module initiates an alarm signal of an unauthorized entry into the engine compartment of the vehicle.

15 Claims, 2 Drawing Sheets

COMBINATION UNDERHOOD SECURITY SWITCH AND LAMP ASSEMBLY

BACKGROUND OF THE INVENTION

1. Field of the Invention

This invention relates generally to a vehicle underhood security system and, more particularly, to a vehicle underhood security system that includes an underhood security switch as part of an underhood lamp assembly.

2. Discussion of the Related Art

Many modern vehicles include security systems that generate alarm signals in response to unauthorized entry into the vehicle. In a typical vehicle security system, the system is armed when the vehicle passenger compartment doors are locked. When the vehicle doors are unlocked by an authorized vehicle operator using a door key or a key fob transmitter, a body control module (BCM) responds to a signal generated by the system indicative of an authorized entry and disarms the security system. The BCM is a computer controller that controls many of the vehicle functions in addition to the vehicle alarm systems, such as air bag circuitry, vehicle electronics, etc. Additionally, the BCM disarms the security system if the doors are locked and the vehicle is operating. If the vehicle passenger compartment is penetrated without the use of the door key or key fob transmitter, an alarm signal will be sent to the BCM. The BCM will issue a warning signal that will cause, in one example, the headlights to flash, the horn to sound, and the engine to become disabled in response to the unauthorized entry into the passenger compartment of the vehicle.

Some vehicles that include security systems against unauthorized entry into the passenger compartment of the vehicle also extend the security to unauthorized entry to the vehicle trunk and/or the vehicle engine compartment under the vehicle hood. As with the passenger compartment of the vehicle, the trunk security system is disarmed when an authorized user uses an appropriate trunk key or key fob transmitter to gain access to the trunk. Unauthorized entry into the vehicle trunk causes the BCM to issue the warning signal.

Although the engine compartment of a vehicle is not entered by use of a key or key fob transmitter, the principle of the underhood security system is basically the same. Typically, the mechanism that unlatches the hood is within the passenger compartment of the vehicle. Therefore, when an authorized vehicle operator legally gains entry to the passenger compartment of the vehicle using the key or key fob transmitter, the BCM will disarm the engine compartment security system. If the passenger compartment security system is not disarmed, opening of the vehicle hood will cause the BCM to issue the warning signal.

FIG. 1 shows a cut-away, front perspective view of a vehicle 10 to illustrate a known underhood security system. A hood 12 of the vehicle 10 is raised to expose an engine compartment 14. Various engine components within the engine compartment 14 are shown as being indicative of all types of engine components for vehicles of the type being described herein. The vehicle 10 is an internal combustion engine type vehicle, however, for the purposes of the invention, other vehicle types, such as electric vehicles, are within the scope of the invention discussed below. Most modern vehicles include a lamp 16 that is activated when the hood 12 is raised to light the engine compartment 14 to allow the vehicle operator to view the engine components in low light situations. A lamp switch (not shown in FIG. 1) is closed in response to the hood 12 being raised to automatically illuminate the lamp 16. A push button switch 20 is secured to a side rail structural member 22 adjacent to a front fender 24 by a bracket (not shown). The bracket is secured to the rail member 22 at a location that will cause a strike plate 28 secured to an undersurface 30 of the hood 12 to contact and push down the switch 20 when the hood 12 is in a closed position.

The switch 20 is associated with the vehicle underhood security system in that when the hood 12 is closed, the switch 20 is pressed down by the strike plate 28 to close the switch 20 and arm the security system. A wire (not shown) is connected to the switch 20 and a BCM (not shown in FIG. 1) controlling the vehicle 10. If a vehicle operator legally gains access to the passenger compartment of the vehicle 10, the BCM will disarm the security system such that if the hood 12 is raised and the switch 20 is disengaged, the BCM does not generate a warning signal. However, if an authorized operator has not legally gained access to the passenger compartment of the vehicle 10, and the hood 12 is opened by force or other means, the security system will be armed such that raising of the hood 12 will disengage the switch 20 and cause the BCM to generate the warning signal.

Although the switch 20 has been somewhat successful in providing the necessary signal to activate the vehicle security system against an unauthorized entry into the engine compartment 14 of the vehicle 10, use of the switch 20 is undesirable because of a number of reasons. For example, the switch adds cost to the vehicle security system. Also, during assembly of the vehicle 10, the switch 20 is secured to the rail member 22 prior to the hood 12 being secured to the vehicle 10. When the hood 12 is secured to the vehicle 10 and is originally put in a closed position, the closing of the hood 12 automatically positions the switch 20 relative to the side rail 22 with respect to the position of the strike plate 28. In other words, the switch 20 is of the type that has a switch clearance that is permanently set by applying a certain amount of force to the switch 20 to calibrate its position. Sometimes it is necessary to readjust the position of the hood 12 relative to the vehicle 10 if the hood 12 is not aligned properly the first time it is secured to the vehicle 10 and closed. If it is necessary to reposition the hood 12 to an aligned position such that the hood 12 is moved upward, then the preset clearance of the switch 20 is not positioned at a desirable location relative to the strike plate 28 anymore. Therefore, the switch 20 may not be activated when the hood 12 is put in a closed position during use.

In order to alleviate the above problem, it is necessary to redesign the switch 20 to return to a precalibrated position if the hood 12 is repositioned. Redesigning of the switch 20 adds a significant cost to the use proposed. What is needed is a switching mechanism for an underhood security system that does not significantly add to the cost of the already existing vehicle and engine components. It is therefore an object of the present invention to provide such a mechanism.

SUMMARY OF THE INVENTION

In accordance with the teachings of the present invention, a combination underhood security switch and lamp assembly is disclosed that provides a security signal to a BCM controlling a vehicle security system when the hood is raised. The lamp assembly includes an appropriate lamp switch, such as a mercury switch or a ball switch, that contacts a switch terminal to illuminate the lamp when the hood is in a raised position. A separate wire is connected from the switch to a vehicle body control module (BCM) such that when the lamp switch is closed, a signal is provided to the BCM indicative of a raised hood. Therefore, if the security system is armed, and the hood is caused to be raised, the BCM will provide an alarm signal of an unauthorized entry into the engine compartment of the vehicle.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a combination underhood security switch and lamp assembly is merely exemplary in nature and is in no way intended to limit the invention or its applications or uses.

Figure 2:
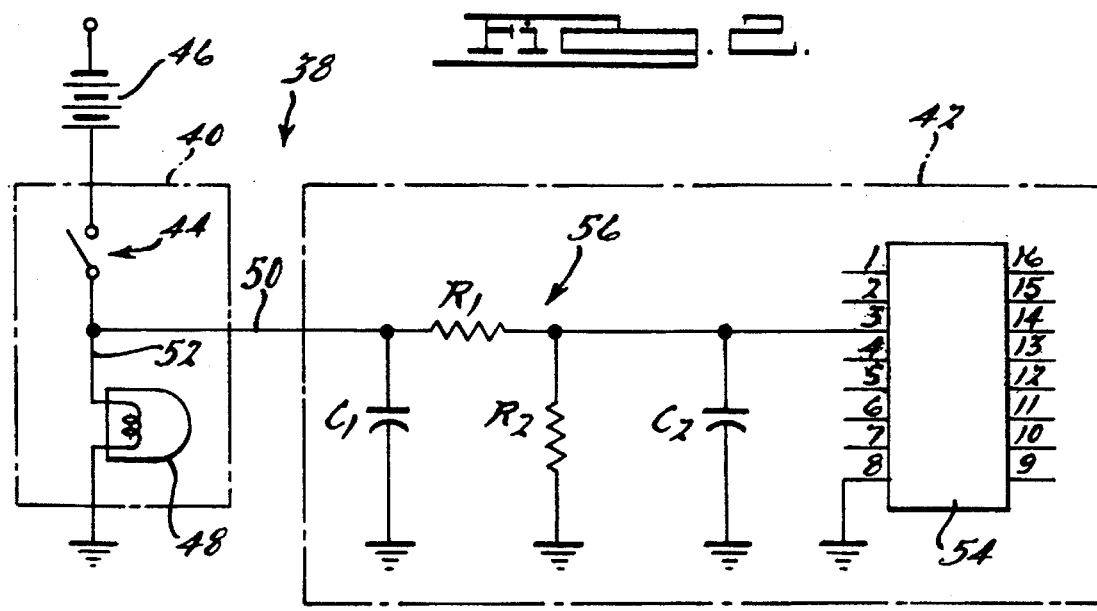
FIG. 2 is a schematic block diagram of a combination underhood security switch and lamp assembly according to an embodiment of the present invention.

FIG. 2 shows a schematic block diagram of an underhood security system 38 according to an embodiment of the present invention. The underhood security system 38 includes a combination security switch and lamp assembly 40 and a vehicle BCM 42. The lamp assembly 40 includes a switch 44 that has one terminal connected to a positive terminal of a vehicle battery 46 and another terminal connected to a terminal of a lamp 48. The lamp 48 can be any known lamp suitable for the purposes described herein. An opposite terminal of the lamp 48 is connected to ground, as shown. A wire 50 is electrically connected to a wire 52 connecting the switch 44 to the lamp 48 as shown.

The wire 50 is also electrically connected to an input pin (pin 3) of an integrated chip microprocessor 54 through a filter 56 in the BCM 42. The filter 56 includes various resistors and capacitors, as shown, to filter the signal on the wire 50 to apply a clean DC level signal to the microprocessor 54. When the switch 44 is closed, power from the battery 46 is applied to the lamp 48 through the switch 44 and the wire 52 to cause the lamp 48 to be illuminated. The power signal is also applied to the input pin 3 of the microprocessor 54 in the BCM 42 through the switch 44 and the wire 50. The power signal from the battery 46 is a "high" signal that allows the BCM 42 to know when the switch 44 is closed.

Figure 1:
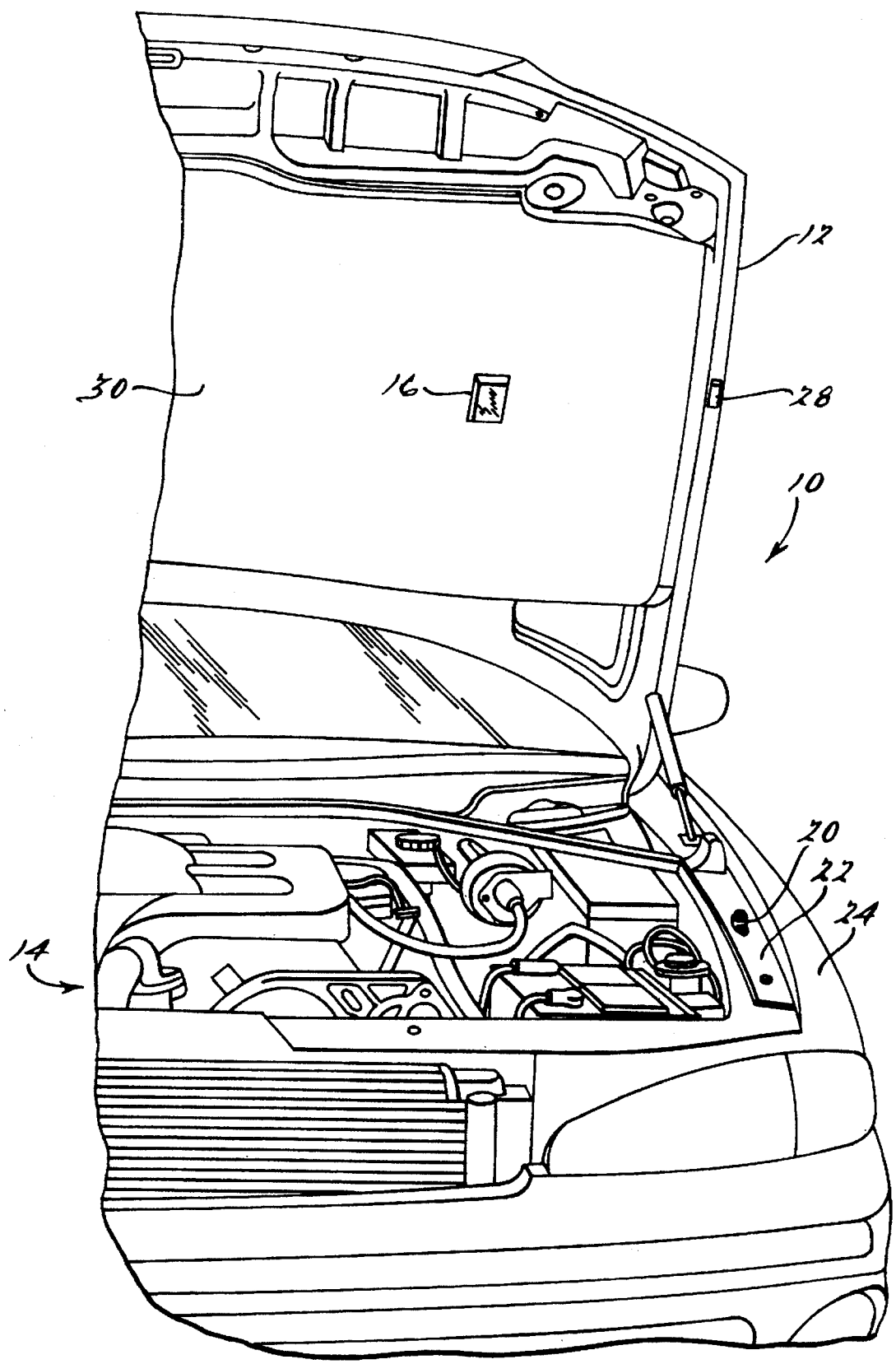
FIG. 1 is a cut-away front perspective view of a vehicle including an underhood security system switch of the prior art.

The electrical configuration of the vehicle battery 46, the switch 44 and the lamp 48 is a typical electrical configuration for an underhood lamp and could be the lamp 16 of FIG. 1. The switch 44 is automatically closed when the hood 12 is raised to cause the lamp 48 to be illuminated. Likewise, the switch 44 is automatically opened when the hood 12 is closed to cause the lamp 48 to be extinguished. The BCM 42 is a known BCM that controls known vehicle systems such as a passenger compartment security system, trunk security system, air bag, headlights, etc., as is well understood in the art. The integrated chip microprocessor 52 can be any microprocessor known in the art that is suitable for the purposes described herein. It would be a straightforward process to one skilled in the art to connect the line 50 to the lamp assembly 40 and to the microprocessor 52 as shown, and program the microprocessor 52 in a manner that would allow the microprocessor 52 to monitor the signal on the line 50 at the input pin 3. Therefore, as with the implementation of the security switch 20 discussed above with reference to FIG. 1, the BCM 42 would monitor the signals on the wire 50 to create an alarm signal if an unauthorized entry into the engine compartment 14 occurred, and ignore a high signal on the wire 50 if the security system has been disarmed.

Figure 3:
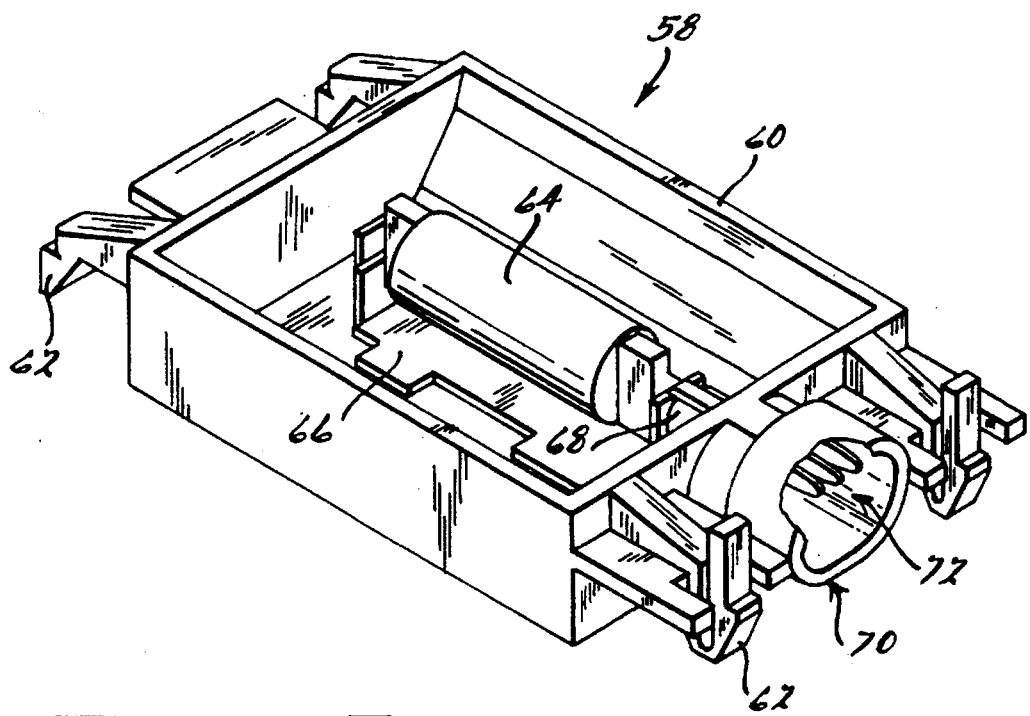
FIG. 3 is a cut-away perspective plan view of a combination underhood security switch and lamp assembly according to an embodiment of the present invention.

FIG. 3 shows a cut-away perspective view of a combination security switch and lamp assembly 58 according to an embodiment of the present invention. The lamp assembly 58 includes a lamp housing 60 that is generally an injection molded plastic part molded from a suitable plastic. The lamp housing 60 could represent a housing of the lamp 16 of FIG. 1. As would be appreciated by those skilled in the art, other lamp housing shapes are applicable for the present invention. The lamp housing 60 includes a series of integrally molded securing prongs 62 that allow the housing 60 to be secured to the undersurface 30 of the hood 12. The housing 60 includes a housing cover (not shown) that covers the housing 60 and provides a translucent interface through which light generated in the housing 60 is emitted from.

A lamp 64 intended to represent the lamp 48 is rigidly secured within the housing 60 and is connected to an electrical connector 66 to provide electrical power to the lamp 64. A switch 68 is connected to the electrical connector 66 at one end of the lamp 64, and is intended to represent the switch 44 above. In the embodiment shown, the switch 68 is an enclosed conductive cylinder that houses a mercury contact or conductive ball contact (not shown). Displacement of the hood 12 to a raised location causes movement of the ball or mercury contact within the cylinder to provide an appropriate electrical contact with a terminal (not shown) of the switch 68 to provide the electrical connection. Switches of this type are well known, and could be implemented within the lamp 16 of FIG. 1. Of course, any switch applicable for the purposes described herein can be used in place of the switch 68. What is important is that the switch 68 is automatically closed and the lamp 64 is illuminated when the hood 12 is raised, and the switch 68 is automatically opened and the lamp 64 is extinguished when the hood 12 is closed.

The housing 60 includes an integrally molded electrical port 70 at one end of the housing 60, as shown. A three-terminal electrical connector 72 associated with the port 70 is electrically connected to the connector 66 and the switch 68 in the electrical configuration as shown in FIG. 2. In this manner, one of the terminals of the connector 72 is connected to the battery 46, another of the terminals of the connector 72 is connected to ground, and the third of the terminals of the connector 72 is connected to the wire 50 to be connected to the BCM 42. Other housing configurations and lamp assemblies can be provided within the scope of the present invention in which a wire is connected to a vehicle BCM to give an indication of when an underhood lamp is illuminated.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A security system for a vehicle, said system comprising:
   a lamp assembly, said lamp assembly including a lamp and a lamp switch positioned within a single housing, said lamp switch being electrically connected to the lamp and to a power source, said lamp receiving power from the power source when the switch is in a closed position, said lamp assembly further including an underhood security system signal line, said underhood security system signal line being electrically connected to the lamp switch within the housing; and
   a controller electrically connected to the security system signal line, said controller being responsive to a security signal on the security line when the switch is closed.

2. The system according to claim 1 wherein the controller is a body control module of the vehicle that controls vehicle security systems, said body control module providing an alarm signal in response to the security signal.

3. The system according to claim 1 wherein the housing is an injection molded plastic housing that encloses the lamp switch and the lamp.

4. The system according to claim 1 wherein the lamp assembly includes a three-terminal electrical port where a first terminal is connected to a vehicle battery, a second terminal is connected to ground and a third terminal is connected to the security system line.

5. The system according to claim 1 wherein the lamp switch is selected from the group consisting of a mercury switch and a ball switch including a ball enclosed within a cylinder.

6. The system according to claim 1 wherein the housing is secured to an underside surface of a vehicle hood.

7. The system according to claim 6 wherein the lamp switch is positioned to cause the lamp to be illuminated when the vehicle hood is placed in a raised position.

8. The system according to claim 3 wherein the housing includes a plurality of securing prongs positioned to secure the lamp assembly to an undersurface of a hood of the vehicle.

9. A method of monitoring unauthorized entry into an engine compartment of a vehicle, said method comprising the steps of:
   providing a lamp assembly, said step of providing a lamp assembly including providing a lamp and a lamp switch where the lamp switch is electrically connected to the lamp and a power source such that the lamp receives power from the power source when the switch is closed, said step of providing a lamp assembly further including providing an underhood security system signal line, said step of providing a lamp assembly further including providing the lamp and the lamp switch in a single housing and connecting the underhood security system signal line to the lamp switch within the housing;
   providing a controller electrically connected to the security system signal line;
   monitoring a signal on the security system signal line by the controller; and
   issuing an alarm signal if the vehicle security system is armed and the vehicle hood is raised causing the lamp switch to close.

10. The method according to claim 9 wherein the step of providing a lamp assembly includes providing a lamp assembly having an injection molded plastic housing that encloses the lamp switch and the lamp.

11. The method according to claim 9 wherein the step of providing a lamp switch includes providing a lamp switch selected from the group consisting of a mercury switch and a ball switch.

12. The method according to claim 9 further comprising the step of securing the lamp assembly to an underside of a hood of the vehicle.

13. An underhood security system for securing an engine compartment of a vehicle, said system comprising:
   a lamp assembly, said lamp assembly including a lamp and a lamp switch positioned within a molded plastic housing to enclose the lamp and the lamp switch, said housing including a plurality of integral securing prongs positioned to secure the lamp assembly to an undersurface of a hood of the vehicle, said lamp switch being electrically connected to the lamp and to a power source, said lamp receiving power from the power source when the lamp switch is in a closed position, said lamp assembly further including an underhood security system signal line electrically connected to the lamp switch within the housing; and
   a body control module electrically connected to the security system signal line, said control module being responsive to a security signal on the security line when the switch is closed, said body control module providing an alarm signal and response to the security signal.

14. The system according to claim 13 wherein the lamp assembly includes a three-terminal electrical port where a first terminal is connected to a vehicle battery, a second terminal is connected to ground and a third terminal is connected to the security system line.

15. The system according to claim 13 wherein the lamp switch is selected from the group consisting of a mercury switch and a ball switch including a ball enclosed within a cylinder.

* * * * *